United States Patent [19]

Blaser

[11] Patent Number: 5,277,447
[45] Date of Patent: Jan. 11, 1994

[54] TRAILER HITCH WITH ALIGNMENT ADAPTER

[76] Inventor: James Blaser, 14808 Washington Ave., Union Grove, Wis. 53182

[21] Appl. No.: 44,718

[22] Filed: Apr. 12, 1993

[51] Int. Cl.$^5$ .......................... B60D 1/167; B60D 1/40
[52] U.S. Cl. ............................. 280/479.2; 280/478.1; 280/479.3
[58] Field of Search ............... 280/415.1, 479.2, 479.3, 280/478.1, 477

[56] References Cited

U.S. PATENT DOCUMENTS

| 2,988,383 | 6/1961 | Carson | 280/478.1 |
|---|---|---|---|
| 3,169,028 | 2/1965 | Scrivner | 280/478.1 |
| 3,437,355 | 4/1969 | Jeffes | 280/478.1 |
| 3,891,237 | 6/1975 | Allen | 280/477 |
| 4,125,272 | 11/1978 | Putnam, Jr. et al. | 280/478.1 |
| 4,176,854 | 12/1979 | Hill | 280/478.1 |
| 4,515,387 | 5/1985 | Schuck | 280/478.1 |
| 4,606,549 | 8/1986 | Williams, Jr. | 280/478.1 |
| 4,759,564 | 7/1988 | Williams, Jr. | 280/478.1 |
| 4,773,667 | 9/1988 | Elkins | 280/478.1 |
| 4,794,867 | 1/1989 | Titz | 105/3 |
| 4,991,865 | 2/1991 | Francisco | 280/477 |
| 5,009,446 | 4/1991 | Davis | 280/279 |
| 5,011,176 | 4/1991 | Eppinette | 280/479.3 |

FOREIGN PATENT DOCUMENTS

| 934358 | 8/1963 | United Kingdom . |
|---|---|---|
| 1405258 | 9/1975 | United Kingdom . |
| 2069430A | 8/1981 | United Kingdom . |

Primary Examiner—Mitchell J. Hill
Attorney, Agent, or Firm—Jansson & Shupe, Ltd.

[57] ABSTRACT

In a trailer hitch connecting a towing vehicle and an trailing vehicle, each "coupling" member of each vehicle has a support component and an attachment component. An adapter is interposed between and attached to the support component and the attachment component of one member. The adapter has a guide plug telescoped with the support component and an adjustment portion coupled to the attachment component and hinged to the guide plug for lateral movement. A pair of angled faces on the adapter serve to cam the components into axial alignment as the towing vehicle and the trailing vehicle are brought closer together. The adapter is capable of both axial and lateral, swinging movement for easy vehicle attachment.

14 Claims, 5 Drawing Sheets

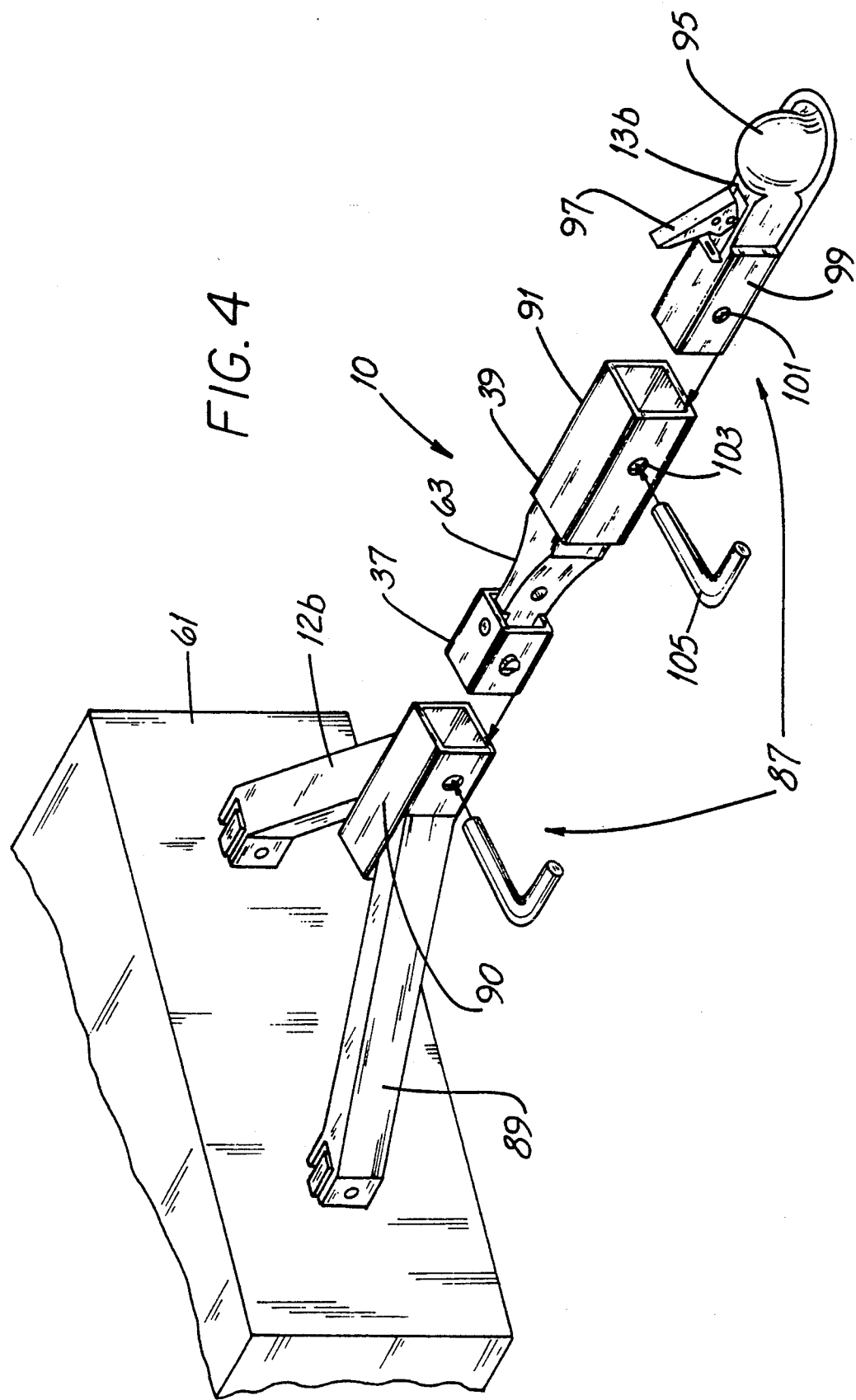

TRAILER HITCH WITH ALIGNMENT ADAPTER

FIELD OF THE INVENTION

This invention is related generally to vehicular towing and, more particularly, to apparatus for towing an unpowered vehicle by a powered vehicle.

BACKGROUND OF THE INVENTION

Trailer hitches are in wide use for towing many kinds of trailing vehicles, e.g., boat trailers, autos and the like, behind another vehicle. As used herein, the term "trailer" refers to any type of vehicle, whether or not capable of self-propulsion, which is to be towed or is under tow by another vehicle.

Most such hitches use a spherical ball attached to one of the vehicles and a hollow, hemispherical coupler attached to the other. To hitch the vehicles together, the ball and coupler are brought into precise alignment, the coupler lowered onto the ball and the coupler latching lever pressed into place. And such hitches are available in a wide variety of sizes and ratings (and corresponding hitch component weights) to suit a broad range of requirements.

A major disadvantage of conventional hitches is that they are rigid. That is, they are made in such a way that once mounted to the vehicle, the spherical ball is in a fixed position with respect to such vehicle. Similarly, the coupler is in a position which, at least laterally and axially, is fixed with respect to the vehicle on which it is mounted. As a consequence, the ball and coupler must be precisely vertically aligned before the coupler can be lowered onto the ball for hookup. This is not a particularly imposing task if the trailer is lightweight and/or if two people, a driver and an observer, participate in the task.

However, trailers are often very heavy and, frequently, hookup is desired to be made by a single person working alone. And trailer hitches are often employed by elderly retired persons who, even working in pairs, are physically unable to perform the heavy pulling and tugging required to make a hookup with a conventional hitch and a heavy trailer.

Thus, conventional hitches are distinctly disadvantageous for the elderly and/or for persons working alone.

Yet another disadvantage of conventional hitches relates to the fact that to achieve precise alignment of ball and coupler, the observer is virtually required to stand between the vehicles as the towing vehicle is backed toward the trailer. Of course, this may present some risk to the observer if the driver of the towing vehicle is not extremely careful.

Earlier patents depict efforts to resolve some of these concerns. For example, the hitch shown in U.S. Pat. No. 4,176,854 (Hill et al.) has a bottom plate and upper cover plate shaped like a truncated triangle. A bar-like coupling arm fits into and slides in the space lateral swinging movement and axial movement to align the ball and the ball-hitch receiver.

U.S. Pat. No. 3,169,028 (Scrivner) shows a hitch very similar to that shown in the Hill et al. patent. That is, it has a flat drawbar which moves axially and laterally between top and bottom plates. Axial movement is both made possible and limited by a pin-and-groove arrangement.

U.S. Pat. No. 3,437,355 (Jeffes) shows a coupling with a hollow outer member and an inner member having portions shaped like the gripping end of a ball bat. The inner member can move axially in the outer member and when partially or fully extended, can also move laterally and vertically.

The hitch shown in U.S. Pat. No. 4,125,272 (Putnam, Jr. et al.) has an arm which hooks to a hitch ball on a towing vehicle and a rectangular-section, tube-like slide which fits into a guide tube on a trailer. The arm and slide are connected together by a universal joint which permits the arm to move laterally and up/down with respect to the slide. When the slide is fully outwardly extended (in what the patent calls a "prehitch" arrangement), a spring-biased pin on the trailer tongue engages the rear end of the slide and prevents disconnection.

In using such hitch, prehitching is performed first. Then the towing vehicle is driven forward and the towed vehicle, then supported on its own caster wheel(s), is drawn to an approximately aligned position. The towing vehicle then backs for final alignment and connection. Final alignment is aided by a pair of angled lateral sides on the arm.

U.S. Pat. No. 4,606,549 (Williams, Jr.) shows a hitch, the elongate shank unit of which is attached to a trailer ball socket before the trailer and the towing vehicle are coupled together. A hollow, tube-like receiving unit is attached to the towing vehicle and has a funnel-like mouth. As the towing vehicle is backed, the extended, rounded end of the shank unit is guided by the mouth into the receiving unit for later locking.

The hitch shown in U.S. Pat. No. 4,759,564 (Williams, Jr.) is closely similar to that shown in the Williams, Jr. patent noted above. A modification is that the shank unit shown in the '564 patent has a pair of stop blocks limiting unit travel at a location where pin engagement holes in the shank unit and the receiving unit are aligned. In both of the Williams, Jr. patents, aligned attachment is by backing the towing vehicle rather than by hand manipulation.

The hitch shown in U.S. Pat. No. 4,515,387 (Schuck) has an outer housing formed of parallel top and bottom plates and flared sides. An inner housing slides inward and outward within the outer housing and like the arrangement of the Scrivner patent discussed above, sliding movement is both permitted and limited by a pin-and-groove arrangement. The Schuck patent suggests that the inner housing (and the tongue within it) can be swung from side to side for alignment only when the inner housing is drawn fully outward. So constructed, the Schuck hitch is capable of aligned connection only along an arc, not axially.

U.K. Patent Application GB 2 069 430 shows sighting rods for aligning a towing vehicle with a trailer.

OBJECTS OF THE INVENTION

It is an object of this invention to provide a trailer hitch and adapter overcoming some of the problems and shortcomings of devices of the prior art.

Another object of this invention is to provide a trailer hitch and adapter which can be used by one person to hook up a towing vehicle and a trailer.

Another object of this invention is to provide a trailer hitch and adapter which is suitable for use with Class "A" hitches.

Another object of this invention is to provide a trailer hitch and adapter wherein the adapter can be used on the connecting member of either the towing vehicle or the trailer.

Still another object of this invention is to provide a trailer hitch and adapter which permits easy axial and lateral alignment of the members to be hooked together.

Yet another object of this invention is to provide a trailer hitch and adapter which, if used while an observer is aiding the driver, avoids the need to position the observer between the towing vehicle and the trailer.

Another object of this invention is to provide a trailer hitch and adapter which does not require precise "preattachment" alignment of the towing vehicle and the trailer.

Another object of this invention is to provide a trailer hitch and adapter wherein the adapter is configured to be used with a standard hitch. These and other important objects will be apparent from the following descriptions and from the drawing.

SUMMARY OF THE INVENTION

The invention includes an adapter which is fitted to a standard trailer hitch and which permits easy hookup with very little lifting. Hookup is possible even though the towing and towed vehicles may not be precisely aligned and even though such vehicles (and the hitch components on them) are not at a precise distance from one another. To put it another way, the adapter permits hookup when the two hitch components are brought into only general proximity of one another. Precise alignment and spacing is not required.

The invention is an improvement in a trailer hitch having first and second members, e.g., that having a spherical ball and that having a hollow, hemispherical coupler. The members connect a powered, towing vehicle and an unpowered, towed trailing vehicle. Each member has a support component and an attachment component. For example, the support component of the first member is a hollow tube of substantially square cross-section which is attached to the towing vehicle. The attachment component of the first member is a solid, square stud portion on which is mounted an L-shaped or offset ball receiver. The spherical towing ball is mounted on the receiver.

The improvement comprises an adapter interposed between and attached to the support component and the attachment component of one member. The adapter includes a guide plug telescoped with the support component (to, e.g., the noted hollow tube) so that the adapter can be moved axially with respect to such component. Such movement is between a towing position and an intermediate hitching position. The adapter also includes an adjustment portion coupled to the attachment component (to, e.g., the square stud) and hinged to the guide plug for lateral movement so that the adjustment portion can be swung to either side.

The adapter also recognizes the probability that the vehicles may not be precisely axially aligned once hookup is achieved. The adjustment portion has a pair of angled faces so that irrespective of whether the trailing vehicle is laterally "offset" with respect to the towing vehicle, the components are cammed into axial alignment as the towing vehicle and the trailing vehicle are brought together as by backing the towing vehicle toward the trailing vehicle. So constructed, the adapter permits lateral and axial positioning adjustment for coupling the first and second members.

The invention is ideal for Class A hitches which are themselves quite heavy and which are intended for extremely heavy loads. It is understood that welding on such a hitch must be performed by a certified welder and the hitch itself tested to a standard before sale.

In a highly preferred embodiment, the adapter is configured for easy use and easy detachment. For example, the adapter includes an abutment-type stop surface and the adjustment portion and the support component each include apertures. When the support component and the stop surface are in abutment, the apertures are in registry for receiving a locking pin securing the support component and the adapter together for towing.

It is also preferred that the hitch with its adapter be very solid while towing. To that end, the support component includes an interior cavity bounded by walls. The adjustment portion includes a shoulder which fits between the walls with slight clearance. In the preferred embodiment, the interior cavity has a cross-sectional shape and the guide plug and the shoulder each have a cross-sectional shape generally corresponding to the cross-sectional shape of the interior cavity. Since the guide plug thereby prevents one end of the adapter from moving laterally and, in the towing position, the shoulder provides a similar function at the other adapter end, the hitch is made substantially rigid in the towing position.

The adapter, which is easily installed and removed, is quite heavy. Therefore, it is desirable to provide a way to prevent the adapter from being inadvertently totally detached from the support component preparatory to hookup. In a preferred arrangement, the guide plug has at least one stop ear extending into an aperture of the support component and limiting movement of the adjustment portion at the intermediate hitching position. Most preferably, the support component has a pair of apertures and the guide plug has a pair of stop ears spring-biased in opposite directions. When the adapter is axially moved to the hitching position and reaches its intended outer limit of travel, each stop ear "pops into" a separate aperture of the support component and prevents further outward adapter movement.

Of course, when the ears extend into the apertures (when the adjustment portion is in the hitching position), they engage the support component. Since the biasing spring is preferably quite "stiff," each stop ear includes a bevelled surface urging that stop ear out of engagement with the support component when the adapter is moved from the hitching position to the towing position. In other words, each bevelled surface acts like a cam.

As mentioned above, the adapter may be used with standard hitches. In a very popular type of standard hitch, the support component comprises a hollow tube having an interior cavity and the attachment component has a stud portion sized to fit within the cavity with slight sliding clearance. When the adapter is used with such a hitch, the guide plug is received in the cavity and the stud portion is coupled to the adjustment portion. Preferably, the adjustment portion is hollow and the stud portion is telescopically received in the adjustment portion.

And the adapter is highly flexible in application in that it can be used on either the powered, towing vehicle or on the towed vehicle. In the former arrangement, the adapter is interposed between the support component and the attachment component of the first member and the first member comprises a part of the towing vehicle. In such arrangement, an offset ball receiver is attached to the stud portion and has a ball mounted on it. The stud portion and the adjustment portion each have a generally rectangular cross-sectional shape and the receiver and the stud portion may be mounted in either of two positions relative to the adjustment portion. In that way, the attachment elevation of the ball may be changed.

In the latter arrangement where the adapter is used on the towed vehicle, the adapter is interposed between the support component and the attachment component of the second member and the second member comprises a part of the trailing vehicle. In one configuration, the second member includes a pair of arms arranged in a "V" shape to define an angle therebetween. The attachment component of the adapter is disposed along an axis bisecting the angle. Further details of the invention are set forth in the following detailed description and in the drawing.

BRIEF DESCRIPTION OF THE DRAWING

FIG. 4 is an isometric view of the adapter and hitch components as part of a trailer. The adapter and hitch components are shown separated from one another and portions of the trailer are broken away.

DETAILED DESCRIPTION OF THE PREFERRED EMBODIMENTS

Figure 1:
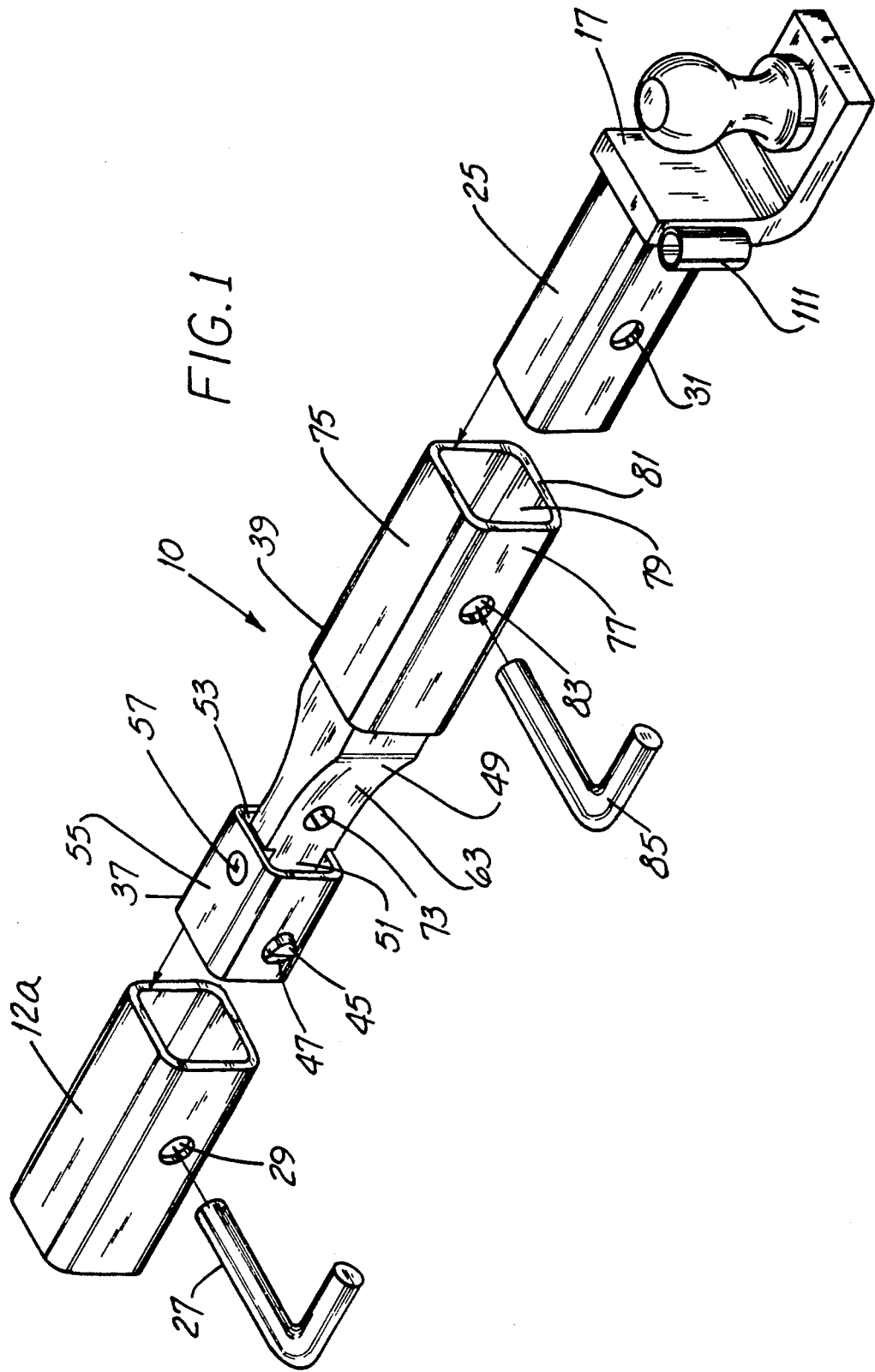
FIG. 1 is an isometric view of the adapter shown in conjunction with standard hitch components.
Figure 7:
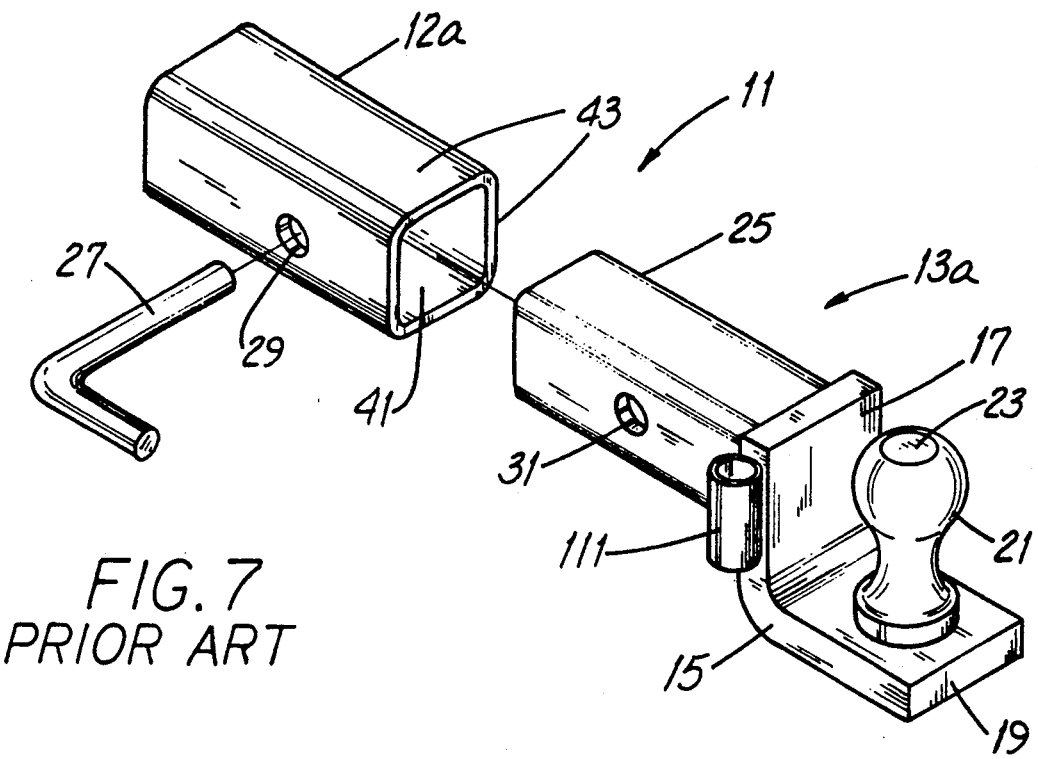
FIG. 7 is an isometric view of known components of a Class "A" trailer hitch.

Referring first to FIGS. 1 and 7, an advantage of the adapter 10 is that it may be used with standard trailer hitch mechanisms. As shown in FIG. 7, a mechanism 11 embodied as a Class "A" hitch includes a support component 12a, an attachment component 13a and an "L" shaped or offset ball receiver 15 having a vertical plate 17 and a tongue 19 extending from such plate 17. A generally spherical ball 21 is attached to the tongue 19 by a through-bolt 23.

The attachment component 13a has a stud portion 25 attached to the plate 17. Such portion 25, which is usually solid, telescopes with (and, specifically, into) the support component 12a which is hollow. When the stud portion 25 is fully telescoped to the support component 12a, a pin 27 is inserted through the holes 29, 31 to hold the components 12a and 13a together.

A feature of the adapter 10 is that it can be used in either of two arrangements, i.e., either with the towing vehicle or with the towed trailer. The first of these arrangements will now be described.

Figure 2:
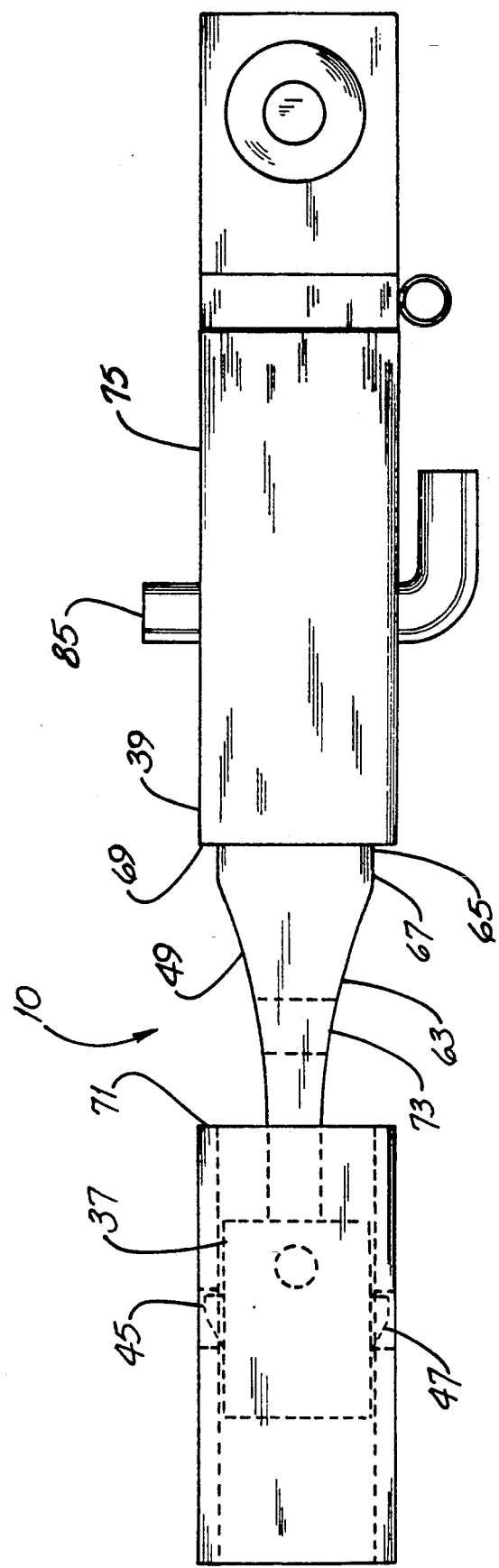
FIG. 2 is a top plan view of the adapter and hitch components of FIG. 1 assembled to one another in a first arrangement and in an intermediate hitching position.
Figure 3:
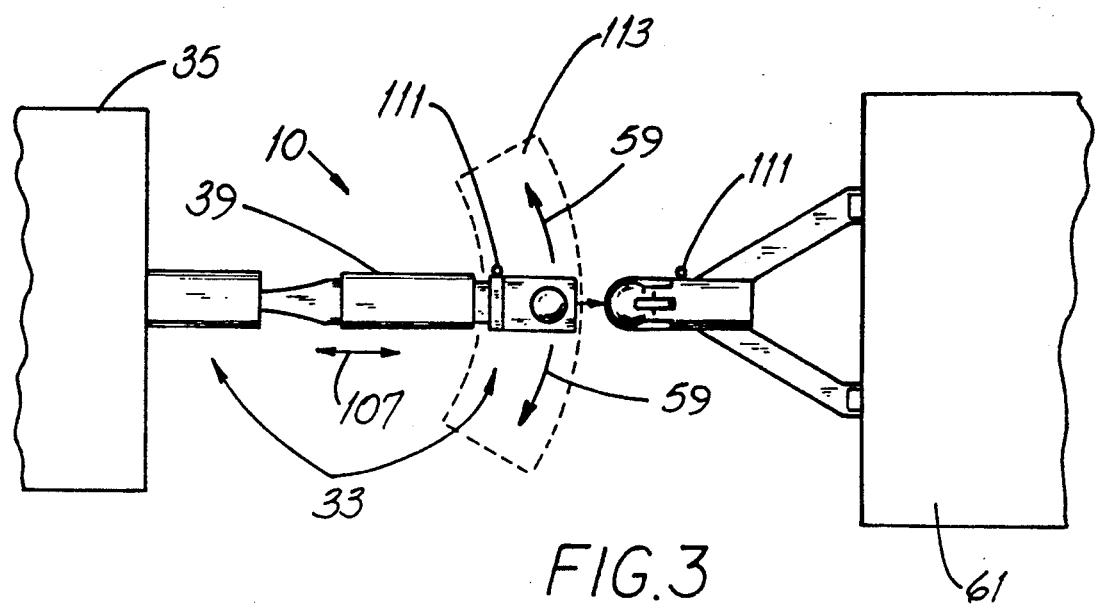
FIG. 3 is a top plan view of the adapter and hitch components as part of the towing vehicle, e.g., a truck, and with the adapter and hitch components in the intermediate hitching position. Portions of the towing vehicle and trailer are broken away.

Referring additionally to FIGS. 2 and 3, the adapter 10 is interposed between and attached to the support component 12a and the attachment component 13a of a first member 33 of a trailer hitch, namely, that member 33 used with the towing vehicle 35. When used as shown in FIG. 3, the support component 12a is attached to the towing vehicle 35 and the attachment component 13a includes the receiver 15 and ball 21 as described above.

Figure 5:
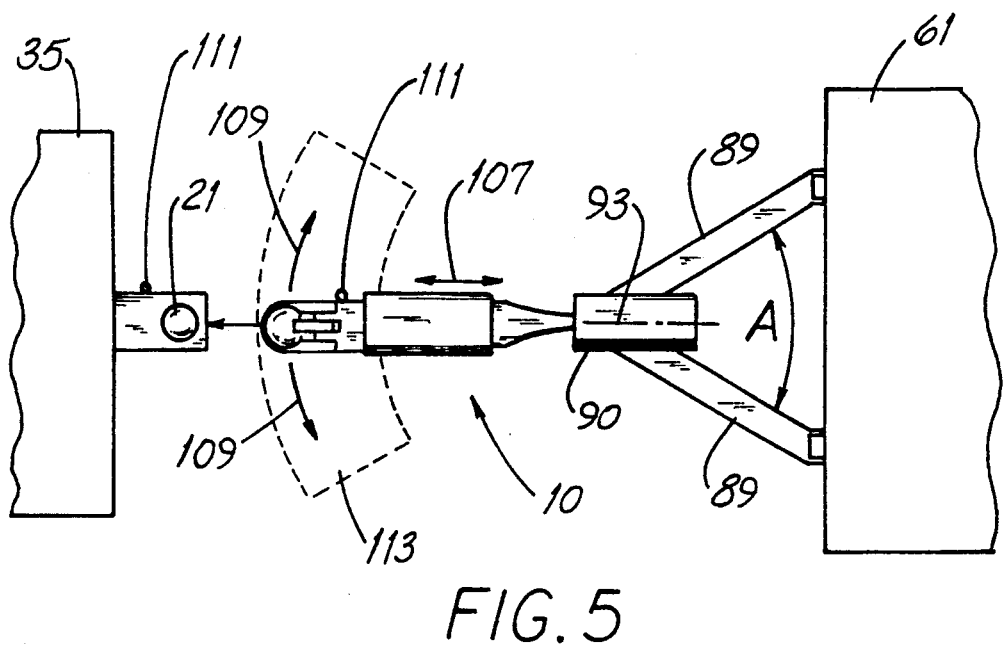
FIG. 5 is a top plan view of the adapter and hitch in a second arrangement as part of the trailer and in the intermediate hitching position. Portions of the towing vehicle and trailer are broken away.
Figure 6:
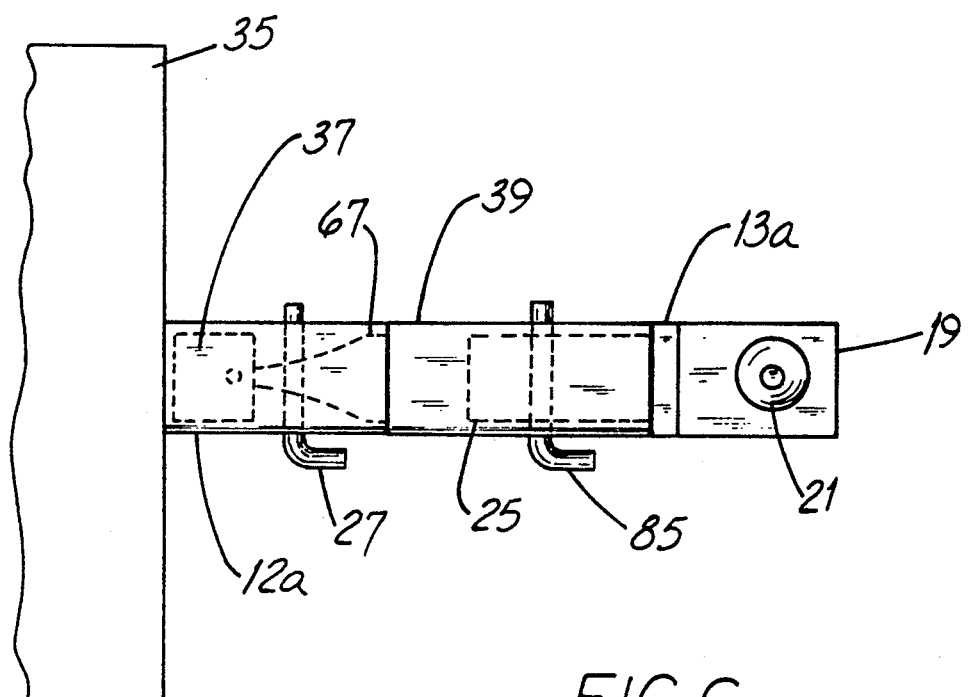
FIG. 6 is a top plan view of the first arrangement of the adapter and hitch components shown in the towing position. Hidden surfaces of certain portions are shown in dashed outline.

The primary components of the adapter 10 are the guide plug 37 and the adjustment portion 39 and the description of each follows in that order. The hollow guide plug 37 is preferably cross-sectionally sized and shaped to telescope with the cavity 41 of the support component 12a, such cavity 41 being bounded by the walls 43. More specifically (and in a highly preferred embodiment), the plug 37 telescopes into the cavity 41 with slight clearance. In that way, the adapter 10 moves axially with respect to such component 12a as the plug 37 slides into or out of the component 12a. Such movement is between a towing position (when the adapter 10 and the components 12a are fully telescoped and "locked up" as shown in FIG. 6) and an intermediate hitching position when the adapter 10 is extended for hookup as shown in FIGS. 3 or 5.

The adapter 10, which is easily installed and removed, is quite heavy when configured for a Class "A" hitch. It is desirable to provide a way to prevent the adapter 10 from being inadvertently totally detached from the support component 12a preparatory to hookup. In a preferred arrangement, the guide plug 37 includes a pair of stop ears 45. Such ears 45 are spring-biased outward in opposite directions so that in the absence of opposing inward force, such ears 45 extend slightly beyond the sides of the plug 37.

The support component 12a has a pair of holes 29 which, when the components 12a, 13a are used conventionally, receive a locking pin 27 holding such components 12a, 13a together. When the adapter 10 is moved axially to the hitching position and reaches its intended outer limit of travel, each stop ear 45 "pops" outward into a separate hole 29 of the support component 12a and prevents further outward adapter movement. The ears 45 are sized and located so that each ear 45 "pops out" to extend into a hole 29 as the adapter 10 is drawn outward from the component 12a to the intermediate hitch position shown in FIG. 3. In other words, the relative locations of the ears 45 and the holes 29 "set" the intermediate position.

Of course, when the ears 45 extend into the holes 29, they engage the support component 12a and must be brought out of such engagement to retract the adapter 10 to the towing position. Even though the ears 45 are biased outward with substantial force, the adapter 10 is preferably configured so that it is a relatively easy task to retract the adapter 10 to the towing position.

In a highly preferred embodiment, each stop ear 45 includes a bevelled surface 47 urging that stop ear 45 out of engagement with the support component 12a when the adapter 10 is moved from the hitching position to the towing position. In other words, when the adapter 10 starts movement leftward (in the view of FIG. 2) toward the towing position, each bevelled surface 47 acts like a cam and urges the ear 45 inward so that the plug 37 can be positioned well leftward in the support component 12a.

Referring further to FIGS. 1–3, the adjustment portion 39 of the adapter 10 will now be described. Such portion 39 includes a neck 49, the first end 51 of which is sized to fit into the space 53 defined by the walls 55 of the guide plug 37. The neck end 51 and the plug 37 are connected together by a hinge 57 pin so that the adjustment portion 39 can be swung laterally to either side as represented by the arrows 59. When the adapter 10 is mounted as shown in FIG. 3, the adjustment portion 39 swings in a generally horizontal plane.

The adapter 10 is also configured in recognition of the fact that even though the towing vehicle 35 and the trailer 61 may not be (and, with the invention, need not be) precisely axially aligned when being hooked up, axial alignment must be achieved before towing can begin. The neck 49 has a pair of angled, polished, cam-like faces 63 so that, after hookup and when backing the towing vehicle 35 toward the trailer 61, a face 63 urges the components 12a, 13a into axial alignment.

At its second end 65, the neck 49 includes a shoulder 67 configured in cross-sectional size and shape to fit into the cavity 41 of the support component 12a with slight, sliding clearance. When the hitch and adapter 10 are in the towing position shown in FIG. 6, the stop surface 69 abuts the distal end 71 of the support component 12a and the guide plug 37 and the shoulder 67 cooperate to prevent the adapter 10 from wobbling in the support component 12a. And when the surface 69 and the distal end 71 abut, a hole 73 in the neck 49 is in registry with the holes 29 in the support 12a so that the locking pin 27 can be inserted therethrough.

The adjustment portion 39 of the adapter 10 also has a receiving tube 75 attached to the shoulder 67. Such tube 75 is preferably hollow and has walls 77 defining an interior space 79 for receiving the stud portion 25 with slight sliding clearance. In a highly preferred arrangement for use with known hitches, the support component 12a and the receiving tube 75 are of substantially identical cross-sectional size and shape and have walls of substantially identical thickness.

Further, the receiving tube 75 and the stud portion 25 have cross-sectional sizes and shapes (preferably square or rectangular) which are closely similar to one another so that the tube 75 and the portion 25 can be telescoped together and the hitch and adapter 10 are thereby substantially "wobble-free" when in the towing position. Such configuration also permits inserting the stud portion 25 so that the "L" shaped receiver 15 is mounted with its tongue 19 extending from the bottom of the plate as shown in FIG. 1 or from the top of such plate 17. In that way, the attached elevation of the ball 21 may be changed.

The receiving tube 75 terminates in an abutment face 81 in contact with the plate 17 when the tube 75 and the component 13a are fully telescoped together. The tube 75 includes a pair of side holes 83 sized and located to be in registry with the hole 31 in the stud portion 25 when the face 81 is in contact with the plate 17. When the tube 75 and plate 17 are so positioned, a pin 85 extends through the holes 83, 31 and locks the adapter 10 and the attachment component 13a together for towing.

As indicated above, the adapter 10 can be used with the towed trailer 61 as well as with the towing vehicle 35. Referring now to FIGS. 4 and 5, a description of the adapter 10 used with the trailer 61 will now be set forth. In such arrangement, the adapter is interposed between the support component 12b and the attachment component 13b of the second member 87 and the second member 87 comprises a part of the trailer 61. In one configuration, the support component 12b of the second member 87 includes a pair of arms 89, each of which is pivot mounted at one end to the trailer 61. Such arms 89 are arranged in a "V" shape to define an angle "A" between them.

Such support component 12b also includes a tube 90 similar to the support component 12a and such tube 90 extends along an axis 93 bisecting the angle "A." And like the support component 12a, the tube 90 is sized and shaped to receive the guide plug 37 with slight sliding clearance.

The attachment component 13b has a standard, hollow hemispherical coupler 95 with a locking lever 97 securing the coupler 95 to the ball 21 when the trailer 61 is under tow. The attachment component 13b also has a stud portion 99 and the tube 91 and the stud portion 99 preferably have cross-sectional sizes and shapes which are closely similar to one another so that the tube 75 and the portion 99 can be telescoped together and the hitch and adapter 10 are thereby made relatively rigid when in the towing position. Like the stud portion 25 and receiving tube 75 mentioned above, the portion 99 and tube 91 have holes 101 and 103, respectively, which are in registry when the component 13b is properly positioned with respect to the tube 91. A locking pin 105 is inserted through such holes 101, 103 during towing. A tension chain (not shown) is adjustably connectable to the support component 12b in a known manner so that the coupler 95 is held at a height slightly above the ball 21 preparatory to hookup.

As shown in FIG. 5, the adapter 10 and attachment component 13b can be moved axially with respect to the trailer 61. Such movement is represented by the arrow 107. And with the adapter 10 in the intermediate hitching position as shown, the attachment component 13b can also be swung side to side as represented by the arrows 109.

The way in which the invention is used will be described with respect to the arrangement shown in FIGS. 1-3 and reference will be made to FIG. 6 in such description. After appreciating such description, the manner of using the adapter 10 as part of the second member 87 and the trailer 61 will be abundantly apparent.

It is first assumed that the user has a towing vehicle 35, e.g., a truck, equipped with the support component 12a and the attachment component 13a shown in FIG. 1. To mount the adapter 10, the pin 27 is removed and the stud portion 25 withdrawn from the support component 12a. The adapter guide plug 37 is then oriented so that its stop ears 45 are at the sides and its hinge pin 57 is vertical. The plug 37 is then inserted into the support component 12a until the ears 45 pop outward into the holes 29 in the support component 12a.

The stud portion 25 is then inserted into the receiving tube 75 until the abutment face 81 and the plate 17 are in contact with one another. The holes 31, 83 will then be in registry and the pin 85 is inserted. Adapter mounting is now complete ready for hookup.

As and if necessary, the towing vehicle 35 is positioned with respect to the trailer 61 so that the vehicle 35 and the trailer 61 are relatively axially aligned and in sufficiently close proximity to one another to permit hookup. As will be apparent (if not already), precisely accurate "spotting" is not required with the invention. A feature which facilitates quick hookup includes a pair of antenna-like sighting rods, one on the attachment component of each member, for visually approximately aligning the hitch members as the towing vehicle is backed toward the trailer. Such rods can be removably inserted in the ferrules 111.

It is apparent from the foregoing description and the drawing that when arranged for hookup, the adapter 10 permits a relatively large amount of axial and lateral "play." Therefore, the hitch and adapter 10 permit hookup any time the ball 21 and coupler 95 are both within an arc-like annular space having a relatively large area as represented by the space 113 enclosed by the dashed line in FIG. 3 or 5. And since any observer directing the vehicle driver can readily see from a short distance away when that condition exists, such observer need not stand between the vehicle 35 and the trailer 61 as the vehicle is backing toward the trailer.

After properly positioning the towing vehicle 35 as described above, the ball 21 is swung until it is laterally aligned with the coupler 95. As necessary, the adapter 10 and ball 21 are also urged toward the support component 12a (by sliding the plug 37 in the component 12a) until the ball 21 is axially aligned with the coupler 95. Thereupon, the coupler 95 is lowered onto the ball 21 and the lever 97 pushed to lock the coupler 95 onto the ball 21.

After hookup, the vehicle 35 and trailer 61 may well not be in precise axial alignment and, in any event, the hitch and adapter 10 are not yet made sufficiently rigid for towing. The vehicle 35 is backed slowly toward the trailer 61 and if there is some misalignment, one or the other of the faces 63 cams the attachment component 13a into alignment with the support component 12a. If the adapter 10 is not already retracted during the activity described above, such backing will cause the bevelled surfaces 47 to urge the ears 45 inward so that the plug 37 can move further into the support component 12a. When the holes 29, 73 are in registry, the pin 27 is inserted. The hitch and adapter 10 will then appear as in FIG. 6 and will be ready for towing.

If it is desired to remove the adapter 10, the trailer 61 is first uncoupled, the pin 85 removed and the stud portion 25 withdrawn from the tube 75. The ears 45 are then urged inward until disengaged from the support component 12a and the plug 37 is withdrawn from such component 12a. If and as necessary, the ears can be urged inward by a C-clamp tool (not shown) having a small-diameter boss affixed to each clamping face. The C-clamp is fitted over the support component 12a so that the bosses line up with the holes 29. The C-clamp is then tightened and the bosses contact the ears 45 and push them inward. The attachment component 13a is then re-installed on the support component 12a in a known manner.

While the principles of this invention have been described in connection with specific embodiments, it should be understood clearly that these descriptions are made only by way of example and are not intended to limit the scope of the invention. For example, a support component 12, an attachment component 13, plug 37, tubes, 75, 90, 91 and stud portion 99 may be other than square in cross-section. While those parts may not then be compatible with standard support components 12a and attachment components 13a now in use, they are nevertheless contemplated by the invention.

I claim:

1. In a trailer hitch having first and second members connecting a powered, towing vehicle and an unpowered, towed trailing vehicle and wherein each member has a support component and an attachment component in axial alignment during towing, the improvement comprising:
   an adapter interposed between and attached to the support component and the attachment component of one member;
   and wherein:
   the adapter includes (a) a guide plug telescoped within the support component and (b) an adjustment portion coupled to the attachment component and hinged to the guide plug for lateral movement;
   the adjustment portion has a pair of angled faces for camming the support component and attachment component into axial alignment as the towing vehicle and the trailing vehicle are brought together; and,
   the adapter is mounted for axial movement relative to the support component, the movement being between a towing position and an intermediate hitching position,
   whereby the adapter permits lateral and axial positioning adjustment for coupling the first and second members.

2. The hitch of claim 1 wherein:
   the adapter includes a stop surface;
   the adjustment portion and the support component each include apertures; and,
   when the support component and the stop surface are in abutment, the apertures are in registry for receiving a locking pin.

3. The hitch of claim 2 wherein:
   the support component includes an interior cavity bounded by walls;
   the adjustment portion includes a shoulder which fits between the walls with slight clearance whereby the hitch is made substantially rigid in the towing position.

4. The hitch of claim 3 wherein:
   the interior cavity has a cross-sectional shape;
   the guide plug and the shoulder each have a cross-sectional shape generally corresponding to the cross-sectional shape of the interior cavity.

5. The hitch of claim 1 wherein:
   the guide plug has at least one stop ear extending into an aperture of the support component and limiting movement of the adjustment portion at the intermediate hitching position.

6. The hitch of claim 5 wherein the guide plug has a pair of stop ears spring-biased in opposite directions and each stop ear extends into a separate aperture of the support component.

7. The hitch of claim 1 wherein:
   the guide plug has a pair of stop ears engaging the support component when the adjustment portion is in the hitching position; and,
   each stop ear includes a bevelled surface urging that stop ear out of engagement with the support component when the adapter is moved from the hitching position to the towing position.

8. The hitch of claim 7 wherein the support component has a pair of apertures, the stop ears are spring biased in opposite directions and each stop ear extends into a separate aperture.

9. The hitch of claim 1 wherein:
   the support component comprises a hollow tube having an interior cavity;
   the attachment component has a stud portion sized to fit within the cavity with slight sliding clearance;

the guide plug is received in the cavity; and, the stud portion is coupled to the adjustment portion.

10. The hitch of claim 9 wherein the adjustment portion is hollow and the stud portion is telescopically received in the adjustment portion.

11. The hitch of claim 10 wherein the adapter is interposed between the support component and the attachment component of the first member and the first member comprises a part of the towing vehicle.

12. The hitch of claim 11 wherein:

an offset ball receiver is attached to the stud portion and has a ball mounted thereon;

the stud portion and the adjustment portion each have a generally rectangular cross-sectional shape; and, the offset ball receiver and the stud portion may be mounted in either of two positions relative to the adjustment portion, whereby the attachment elevation of the ball may be changed.

13. The hitch of claim 10 wherein the adapter is interposed between the support component and the attachment component of the second member and the second member comprises a part of the trailing vehicle.

14. The hitch of claim 13 wherein the support component of the second member includes a pair of arms arranged in a "V" shape to define an angle therebetween and the attachment component is disposed along an axis bisecting the angle.

* * * * *